Patented Oct. 5, 1926.

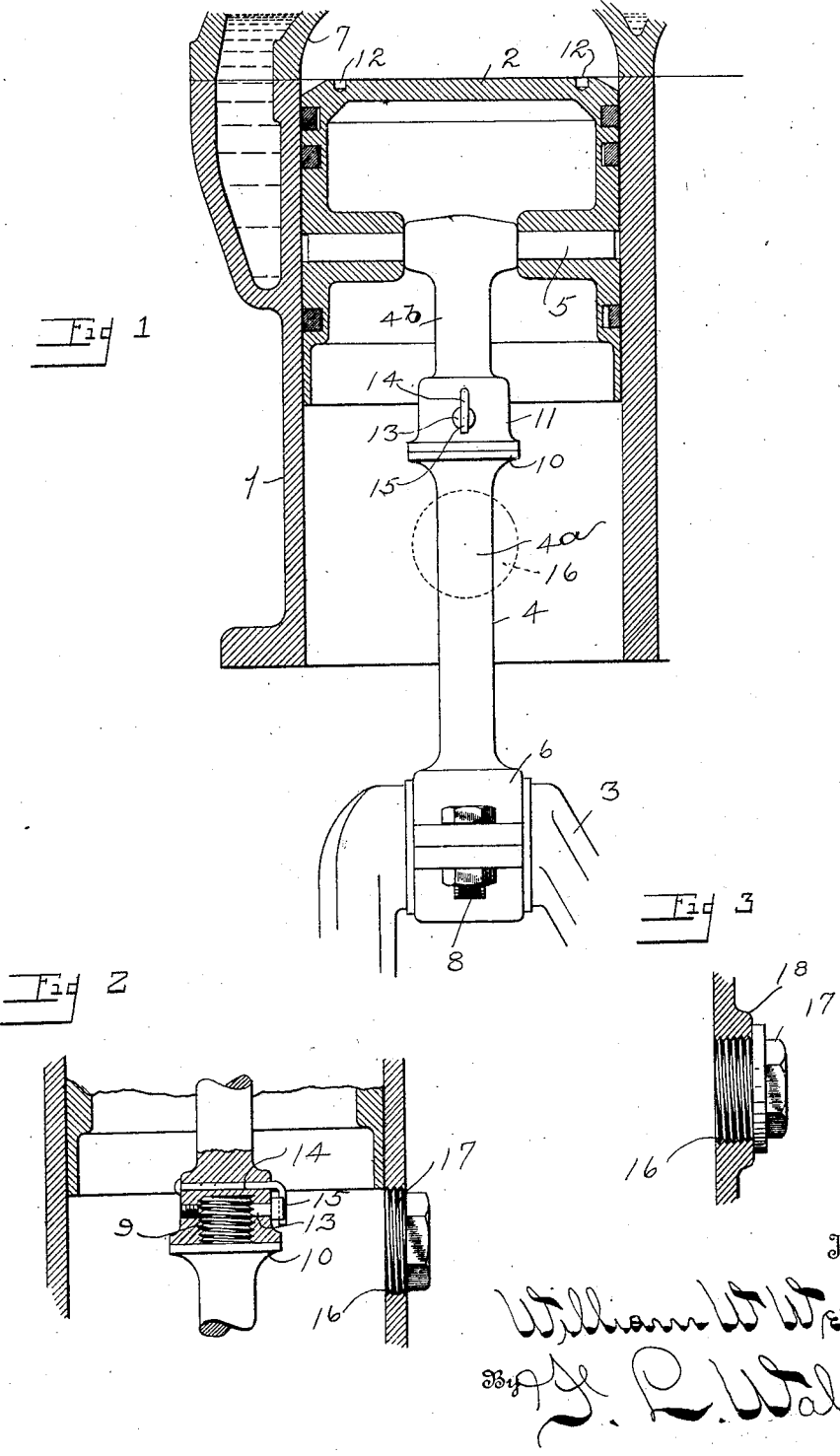

1,602,059

UNITED STATES PATENT OFFICE.

WILLIAM W. WERT, OF DAYTON, OHIO.

SECTIONAL CONNECTING ROD.

Application filed October 8, 1923. Serial No. 667,273.

My invention relates to explosive engines and more particularly to a jointed connecting rod or pitman therefor which will enable the disconnection and removal of the piston head without the necessity of disengaging the connecting rod from the crank shaft.

In the present invention there is contemplated a connecting rod for an ordinary hydro-carbon fuel engine, such as an automobile motor, having a threaded union or joint between the wrist pin bearing and the crank shaft bearing enabling the disconnection of the piston head by rotating the same within the cylinder. To this end the piston head is provided with seats or holes for the engagement of a spanner wrench while to prevent the accidental disengagement or turning of the piston head in relation with the crank shaft bearing, the joint or union is provided with locking means accessible through an opening in the lower portion of the cylinder wall normally closed by a removable plug.

Whereas, it is ordinarily necessary to remove the crank case or housing of an automobile engine and also the cylinder head in order to enable the removal of a piston head, one of the primary objects of the present invention is to facilitate the removal of the piston head for inspection and repairs by enabling its disconnection from the top only, thereby necessitating only the removal of the cylinder head.

A further object of the invention is to provide as a new article of manufacture a connecting rod or pitman for motor vehicle engines and the like having a medial joint or coupling by which the wrist pin bearing head and the bearing head for the crank shaft are capable of separation.

A further object of the invention is to provide improved interlocking means which will maintain the parts in their adjusted relation, and to provide means by which the coupling parts will be readily accessible.

With the above primary and other incidental objects in view as will more fully appear in the specification, the invention consists of the features of construction, the parts and combinations thereof, and the mode of operation, or their equivalents, as hereinafter described and set forth in the claims.

In the accompanying drawing wherein is shown the preferred but obviously not necessarily the only form of the embodiment of the invention, Fig. 1 is a vertical sectional view of a cylinder and piston of a typical automobile motor construction to the connecting rod of which the present invention has been applied. Fig. 2 is a detail sectional view of the coupling and adjacent portions of the cylinder and piston, the section being taken in a plane at right angles to that of Fig. 1. Fig. 3 is a detail view of the closure plug for the access opening in the cylinder wall.

Like parts are indicated by similar characters of reference throughout the several views.

For the purpose of illustration, the present invention has been shown in association with a typical motor vehicle engine construction wherein 1 is a cylinder, and 2 the piston head reciprocating therein. The piston head 2 is connected to the usual crank shaft 3 by means of a connecting rod or pitman 4. The connecting rod or pitman 4 engages at one end with the usual wrist pin 5 mounted in the piston head 2, and at its opposite end is provided with the usual bearing head 6 having engagement with the crank shaft. A portion of the removable cylinder head 7 has been shown. As usually constructed, the connecting rod or pitman 4 is formed in a single unitary piece and in order to remove the piston head 2 from the cylinder 1, it is not only necessary to disconnect the cylinder head 7 but it is also necessary to remove the crank case or housing in order that the bolts 8 connecting the bearing head 6 of the connecting rod or pitman with the crank shaft 3 may be removed, and the connecting rod so disconnected from the crank shaft. Such disassembly and reassembly of the parts requires considerable time and labor and involves more or less skill upon the part of the operator and therefore is seldom undertaken by the driver or owner of a motor vehicle. Consequently the piston and piston rings receive less attention than they should and are frequently seriously neglected.

In order to facilitate the removal of the piston head for inspection and replacement of piston rings, renewal of wrist pin bearings and the like, the connecting rod or pitman 4 in the present instance is formed in two separable parts detachably connected or coupled one to the other. The detachable coupling may be located at any convenient point throughout the length of the connecting rod, that is, it may be adjacent to the lower end and in proximity to the crank shaft bearing head in which case the access opening may be formed in the crank case, or it may be located in proximity to the wrist pin bearing. As the most practical and convenient point, this coupling has been shown in the drawing as located just below the edge of the piston skirt. One section of the connecting rod, in the present instance the lower section $4^a$, is formed with a terminal screw threaded stud or neck 9 surmounting a shouldered head 10. The opposing member, in this instance the section $4^b$ carrying the wrist pin bearing head, is formed with a corresponding head 11 having in the terminal face thereof a screw threaded bore to receive the threaded neck or stud 9. The section $4^a$ of the connecting rod being held against rotation by its engagement with the crank shaft 3, the connecting rod sections $4^a$ and $4^b$ are connected or disconnected by a corresponding rotation of the piston head 2. To this end the head 2 is provided with seats or holes 12 in the top thereof to receive a suitable spanner wrench or other tool by which the head may be rotated. Thus upon removal of the piston head 7, the connecting rod sections $4^a$ and $4^b$ may be disconnected to enable the removal of the piston head 2 from the cylinder 1 without disturbing the crank case or the connection of the bearing head 6 with the crank shaft 3. To prevent accidental disengagement or partial rotation of the piston head 2 and to maintain the axis of the wrist pin bearing parallel with that of the crank shaft bearing, a hole is drilled transversely through the receiving head 11 of the section $4^b$ and the screw threaded stud or neck 9 engageable within such head and a transverse key stud 13 is inserted and secured by being screw threaded into one of the members. Obviously, this key stud 13 may be threaded into either or both walls of the receiving head 11 or in lieu thereof it may be threaded into the stud or neck 9. As a further precaution to prevent loss or disengagement of the key stud 13, a spring pin 14 is extended through the head 11 above the extremity of its receiving bore, the end of this spring pin being bent downwardly and engageable in the slot of the key stud head. By swinging the dependent end 15 of the spring pin 14 out of the slotted head of the stud, this stud may be removed whereupon the piston head 2 may be rotated, by means of the spanner wrench, in relation with the lower section $4^a$ of the connecting rod to uncouple the sections $4^a$ and $4^b$. Access is had to the interior of the cylinder below the piston for purpose of removing and replacing the key stud 13 through a suitable opening 16 in the lower portion of the cylinder wall which access port 16 is normally closed by a removable screw plug 17. This access opening is located below the compression zone and at a point where it will not interfere with the operation of the motor. By turning the crank 3 to and fro thus moving the connecting rod up and down within the cylinder, the coupling point may be brought opposite the access opening 16 as shown in Fig. 2. A pair of long-nosed pliers to disengage the spring pin 14 from the key stud and a screw driver to remove the stud 13 may be introduced through the access opening 16.

A further and quite important advantage of the present construction, is that it enables the bearing engagement of the connecting rod head 6 with the crank shaft 3 to be tested to determine the degree of play or looseness. With the piston head removed as before described, one may grasp the section $4^a$ of the connecting rod and by applying pressure to and fro in the direction of the crank shaft axis the necessity for taking up the crank shaft bearing may be readily ascertained.

The improved connecting rod herein described is applicable to existing motor vehicles by drilling and tapping in the lower portion of the cylinder wall an access opening to be closed by a screw plug 17 as shown in Fig. 2. However, in constructing new motor vehicles embodying the invention, a boss is preferably formed with an annular flange or shoulder as at 18 in Fig. 3.

It is obvious that other forms of interlocking connection may be employed in lieu of the screw threaded coupling and likewise other forms of retainer may be adopted in lieu of the key stud and spring pin, while still embodying the primary features of the sectional connecting rod.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is, therefore, claimed in any of its forms or modifications within the legitimate and valid scope of the appended claims.

Having thus described my invention, I claim:

1. The combination with an engine having a piston therein, and a crank shaft of a connecting rod interconnecting the piston and crank shaft, of a medial coupling in the connecting rod, said engine having therein an access opening, thru which the medial coupling is accessible from the exterior of the engine for effecting the disconnection of the piston without removal from the cylinder and without disconnecting the connecting rod from the crank shaft.

2. The combination with a cylinder, a piston therein, a crank shaft and a connecting rod connecting the piston and crank shaft, of a detachable coupling at a mid length point of said connecting rod, said cylinder having an access opening in the wall thereof below the normal compression zone through which access may be had to couple and uncouple said connecting rod whereby the rod may be separated to permit the removal of the piston from the cylinder without disconnecting the rod from the crank shaft.

3. The combination with an engine, including a cylinder, a piston therein, a crank shaft and a connecting rod connecting the piston and crank shaft, said engine having an access opening therein, of a detachable coupling in said connecting rod at a point accessible from the exterior of the engine through said access opening, by which the connecting rod may be separated into two sections, one connected with the piston and the other with the crank shaft.

4. The combination with a cylinder, a piston therein, a crank shaft and a connecting rod connecting the piston and crank shaft, of a detachable coupling, said cylinder having an access opening in the wall thereof through which said detachable coupling is accessible, and a removable closure for said access opening.

In testimony whereof, I have hereunto set my hand this 17th day of August A. D. 1923.

WILLIAM W. WERT.